(12) United States Patent
Halalay

(10) Patent No.: US 7,749,468 B2
(45) Date of Patent: Jul. 6, 2010

(54) CAVITATION REACTION APPARATUS

(75) Inventor: Ion C. Halalay, Grosse Pointe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 489 days.

(21) Appl. No.: 11/739,149

(22) Filed: Apr. 24, 2007

(65) Prior Publication Data

US 2008/0042305 A1  Feb. 21, 2008

Related U.S. Application Data

(63) Continuation-in-part of application No. 11/465,174, filed on Aug. 17, 2006, now Pat. No. 7,455,713, and a continuation-in-part of application No. 11/465,180, filed on Aug. 17, 2006, now Pat. No. 7,465,333.

(51) Int. Cl.
*F28D 7/00* (2006.01)
*B06B 1/00* (2006.01)
*B01J 19/08* (2006.01)

(52) U.S. Cl. .................. 422/235; 422/128; 422/186; 422/186.16; 422/224; 422/234

(58) Field of Classification Search .............. 422/128, 422/186, 186.16, 224, 234, 235; 210/748
See application file for complete search history.

(56) References Cited

U.S. PATENT DOCUMENTS 6,913,699 B2 * 7/2005 Moisy et al. ............... 210/748
2004/0256213 A1 * 12/2004 Marhasin et al. ....... 204/157.42

* cited by examiner

*Primary Examiner*—Walter D Griffin
*Assistant Examiner*—Lessanework Seifu
(74) *Attorney, Agent, or Firm*—Reising Ethington P.C.

(57) ABSTRACT

An apparatus is provided for carrying out a cavitation induced reaction comprising a reaction chamber for a liquid reaction medium, means for producing cavitation in the liquid reaction medium, at least one reactant inlet to the reaction chamber, an inert gas inlet conduit with a sparger for injecting a flowing stream of dry inert gas into the reaction chamber, a venting outlet for removal of a stream of the inert gas from the reaction chamber, and a recirculation conduit for re-circulating a stream of the inert gas from the venting outlet to the inert gas inlet conduit.

8 Claims, 2 Drawing Sheets

CAVITATION REACTION APPARATUS

This application is a continuation-in-part of co-pending U.S. application Ser. No. 11/465,174, filed Aug. 17, 2006, and Ser. No. 11/465,180, filed Aug. 17, 2006. The entire disclosures of these co-pending applications are hereby incorporated in this application by reference.

TECHNICAL FIELD

This invention pertains to a reactor for sonochemical and other cavitation induced chemical reactions. In an illustrative example, the reactor is used to carry out a reaction using volatile reactants and air- and moisture-sensitive reactants.

BACKGROUND OF THE INVENTION

U.S. patent application Ser. No. 11/465,174, filed Aug. 17, 2006, entitled "Cavitation Process for Titanium Products from Precursor Halides", and Ser. No. 11/465,180, filed Aug. 17, 2006, entitled "Cavitation Process for Products from Precursor Halides", disclose methods for titanium products and other products. These applications are assigned to the assignee of this invention. The disclosed methods employ volatile reactants and reactants that are sensitive to oxygen and water, and the methods employ cavitation methods to stimulate the reactions.

This application provides apparatus for the conduct of such reactions utilizing such oxygen-sensitive and/or moisture sensitive reactants.

SUMMARY OF THE INVENTION

A reaction apparatus is provided for carrying out cavitation induced chemical reactions. The apparatus has utility, for example, where the cavitation is produced in a liquid medium that is suitably inert to the reactants and where one or more of the reactants are volatile at reaction conditions and one or more of the reactants are susceptible to unwanted side reactions with humid air (i.e. with water or oxygen). In one embodiment the apparatus is used with an ultrasonic vibrator to conduct sonochemical reactions. In this embodiment, the sonochemical reactions may be carried out, for example, under substantially anaerobic conditions with reactants dispersed in a non-aqueous solvent.

The reaction apparatus comprises a reaction chamber or volume from which air and water may be excluded. The reaction volume is sized and shaped to contain a suitable volume of liquid reaction medium in which ultrasonic vibrations or other forms of cavitation are introduced. The cavitation may be imposed through a wall of the reaction chamber or directly into the reaction medium for inducing small bubbles in the liquid. The bubbles contain high temperature and high pressure chemical species.

The reaction chamber may have heating or cooling means for controlling the temperature of the liquid reaction medium. In many embodiments the temperature of the liquid reaction medium will be controlled at a set point ranging from −80° C. to +400° C. The reaction chamber has an inlet for selective and controlled admission of one or more reactants.

In an embodiment of the invention the reaction chamber is infused with a flowing and recirculating stream of an inert atmosphere of suitable composition to maintain a suitably low content of water and oxygen in the chamber, and to otherwise be compatible with the selected reactants. In one embodiment of the invention, the inert gas is introduced below the surface of the liquid medium using a sparger or other suitable gas injection device. The reaction apparatus may have a gas recirculation loop for removing a desired portion of inert gas from the reaction volume and re-circulating the stream of inert gas back to the reaction volume. The circulated stream of inert gas may be heated or cooled, treated to remove impurities, reactants or products, or to add materials to the reaction chamber.

As an example, the reaction apparatus may be used for production of particles of titanium metal by reduction of titanium tetrachloride liquid with particles of a reductant metal (for example, a mixture of sodium and potassium) dispersed in a liquid reaction medium. In this example, liquid titanium tetrachloride is added to the reaction chamber where it reacts with the alkali metal particles dispersed in a cavitated hydrocarbon liquid. The atmosphere in the reaction chamber is provided by a stream of circulating dry argon which may be sparged into the liquid reaction medium. As described above, an amount of the argon is removed from the reaction volume through a venting and recirculation line.

In embodiments where volatile reactants, such as titanium tetrachloride are used, a heat exchanger (condenser) in the vent line condenses reactants and reaction medium liquid carried in the vented argon and the condensate is returned (e.g., drained) back into the reaction chamber. The recirculated inert gas may be subjected to suitable separation media as may be desired for removal of impurities such as water or oxygen before the inert gas is pumped back into the reaction volume. Makeup gas or other materials may be added to the circulating stream.

In the titanium chloride example, the cavitation-induced reactions disperse the reductant alkali metal particles in the liquid medium and promote the reduction of the precursor halides. For example, the reaction apparatus containing the liquid medium may be subjected to ultrasonic vibrations, using a transducer that generates sound waves in the liquid at a frequency usually greater than about 20 kilohertz. The sonic energy causes the repeated formation, growth, and collapse of tiny bubbles within the liquid, generating localized centers of very high temperature and pressure, with extremely rapid cooling rates to the bulk liquid. In one embodiment, the liquid medium may have a relatively low vapor pressure at processing temperatures so that the medium contributes little vapor to the high temperature regions in the cavitation bubbles. Meanwhile, the introduction of the inert gas into the liquid may facilitate the formation of the cavitation bubbles with small atoms that will not be reactive at the high temperature in the bubbles.

In one embodiment, the reactor apparatus may be designed for operation as a batch reactor and the reaction products drained from the reactor with the liquid reaction medium at the completion of the reaction. In another embodiment, the reactor apparatus may be operated on a continuous or semi-continuous basis. After the reaction has progressed to a steady state of operation a suitable product-containing stream may be removed from the reactor chamber while reactant streams are being added to it.

Other objects and advantages of the invention will be apparent from a description of some further embodiments.

DESCRIPTION OF PREFERRED EMBODIMENTS

Apparatus comprising a reaction chamber is provided for conduct of chemical reactions promoted by cavitation activation of a liquid medium. The apparatus is adapted for cavitation reactions using a volatile reactant and a reactant that is sensitive to oxygen and/or moisture. The apparatus is further adapted for the circulation of a dry and/or oxygen free inert gas through the reaction chamber to maintain desired low water and/or low oxygen content as the cavitation reaction proceeds. Means are provided for producing cavitation in the liquid medium and for recirculating and, if necessary, purifying the circulating gas stream that provides a protective reaction atmosphere in the reaction chamber.

In one embodiment, the apparatus may be used in conducting sonochemical promoted reactions between a volatile halide reactant and an alkali metal reductant. For example, a metal halide such as titanium chloride may be reacted with a particulate mixture of sodium and potassium in a suitable hydrocarbon liquid to yield small particles of titanium metal and the alkali metal chlorides. Mixtures of selected metal halides may be reduced in such an apparatus with one or more alkali metals to yield useful products such as metals, metal alloys, compounds, ceramics, mixtures, and metal matrix ceramics composites. Many such reaction possibilities are disclosed for example in the above identified parent applications.

Figure 1:
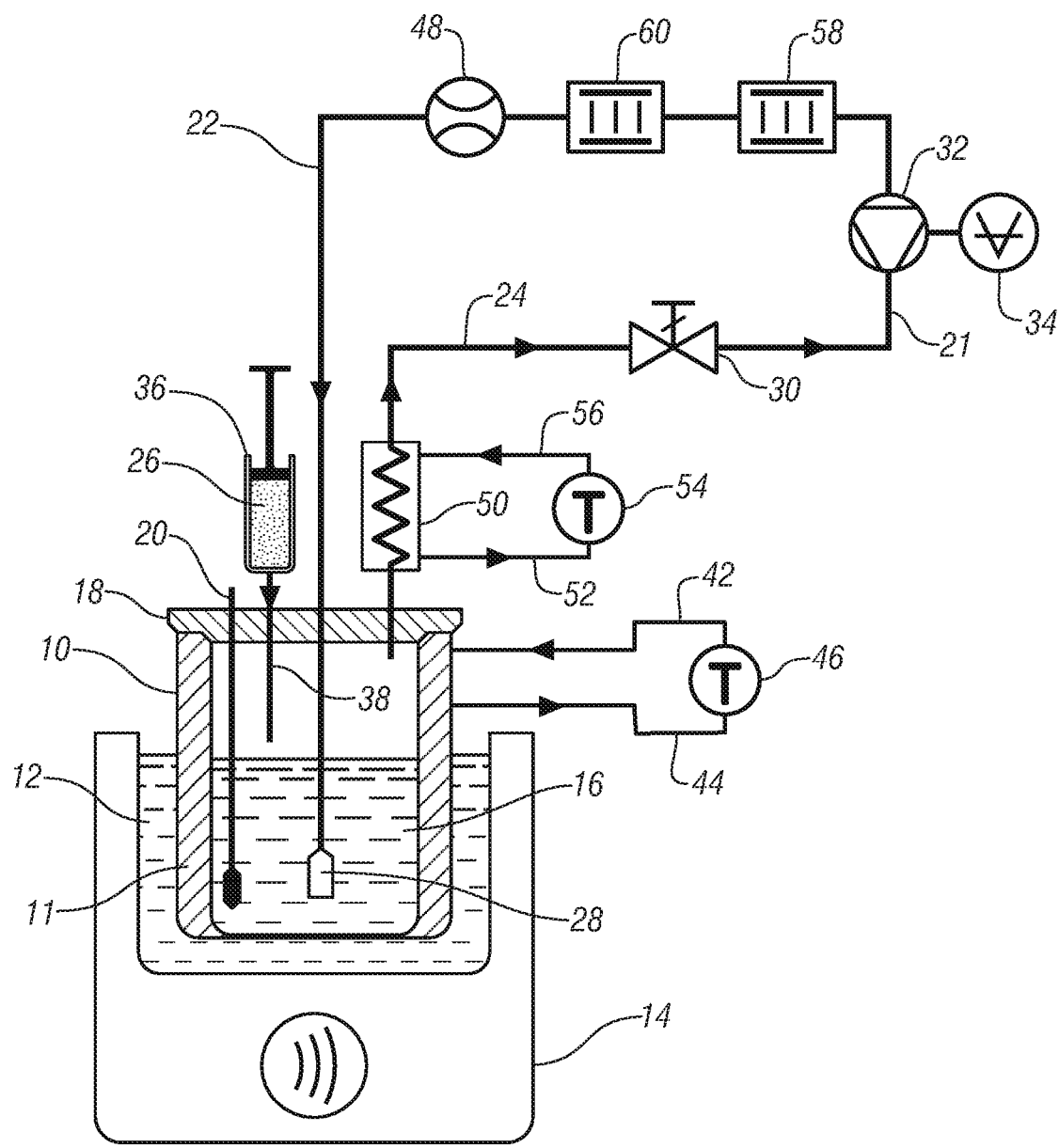
FIG. 1 is a schematic illustration of an apparatus according to one embodiment of the invention.

FIG. 1 illustrates one embodiment of apparatus for conduct of cavitation promoted reactions involving air or moisture sensitive reactants. The illustration is in terms of a laboratory apparatus but the elements of the apparatus may be sized for other larger scale reactions.

Referring to FIG. 1, an apparatus includes a reaction vessel 10. The reaction vessel 10 may be partially immersed in a vibration bath 12 of an ultrasonic generator 14. The ultrasonic generator 14 may be a low power bench top ultrasonic 1.9 L liquid capacity generator with 50 W maximum average sonic power. The reaction vessel 10 may be a glass vessel, for example a 250 mL reaction volume capacity Erlenmeyer flask. The reaction vessel 10 contains a liquid reaction medium 16. The liquid reaction medium 16 may include at least one of low vapor pressure anhydrous hydrocarbons, for example, decalin, tetralin, decane, dodecane, or hexadecane. In one embodiment the liquid reaction medium 16 is anhydrous decalin, available from Sigma Aldrich, catalog no. 294772. In another embodiment, the liquid reaction medium 16 may include at least one of a moderate vapor pressure hydrocarbon, for example, xylene or toluene. The liquid reaction medium 16 may be inert to alkali metals and have relatively low water content, for example below 100 ppm. In another embodiment, the water content may be below 10 ppm.

The ultrasound generated by the ultrasonic generator 14 may be transmitted through the vibration bath 12 and the reaction vessel 10 into the liquid reaction medium 16. The reaction vessel 10 may be sealed with a feed-through cover 18, which may be a 4-port feed-through hermetic cover with a GL-45 thread. A thermometer 20 may extend through the feed-through cover 18. The thermometer 20 may be a stainless steel encased digital thermistor thermometer.

A gas line 21 is used for recirculating a suitable inert gas into reaction vessel 10 and through reaction medium 16. Gas line 21 comprises a gas delivery line 22 and a gas return line 24 both connected to reaction vessel 10 through the hermetic feed-through cover 18. A sparger 28 is located at the end of the portion of the gas feed line 22 inside the reaction vessel 10.

The sparger 28 may be a chemically resistant Hastalloy sparger that is completely submerged in the liquid reaction medium 16 in the reaction vessel 10. The sparger 28 may have pores of diameter ranging from about 0.5 μm to about 200 μm. For example, the sparger 28 may have a pore diameter of 2 μm. The gas line 21 includes a needle valve 30, a gas pump 32, and a pressure gauge 34. The needle valve 30 may be a PEEK needle valve. The diaphragm gas pump 32 may be a chemically resistant diaphragm pump. The pressure gauge 34 may be stainless steel. The gas return line 24 may be connected to the needle valve 30 and the inlet of the gas pump 32. The gas feed line 22 may be connected to the outlet of the gas pump 32.

The reaction conditions in the apparatus may be monitored by the thermometer 20, which is in contact with the reaction medium 16, and by the pressure gauge 34, which aids in achieving a reproducible sparging gas flow through adjustments of the needle valve 30.

A liquid reactant 26 (such as, for example, titanium tetrachloride) may be added to the reaction vessel 10 from a syringe 36 through a reagent addition tube 38 inserted through hermetic feed-through cover 18. The reagent addition tube 38 may have a female Luer connector. The syringe 36 may be a gas-tight syringe with a Teflon plunger and dispensing attachment.

The apparatus may be assembled inside of an argon-filled dry box. Any suitable gas, for example argon, may be sparged. In one embodiment, the sparging may occur in a continuous fashion through the closed gas recirculation loop formed by the sparger 28, the reaction vessel 10, the gas feed line 22, the gas return line 24, and the gas pump 32. The closed-circuit sparging may disperse gas into the reaction medium to facilitate cavitation. The closed-circuit sparging may also prevent the escape of reagents, for example titanium tetrachloride, from the reaction apparatus to help maintain close to 100% reaction yields.

The closed gas recirculation loop serves at least two purposes. First, it allows any volatile reagents that may be present to recirculate into the reaction vessel 10 and disperse into the reaction medium 16 via the sparger 28. Second, the amount of oxygen that can enter the reaction region is minimized because it is limited to the amount of oxygen that exists inside of the closed recirculation loop.

At STP, 1 cm$^3$ of gas contains a number of molecules equal to Loschmidt's number, $2.69 \times 10^{19}$. Therefore, in a glove-box atmosphere containing only 1 ppm oxygen there will be $2.69 \times 10^{13}$ oxygen molecules in every cubic centimeter, which is an enormous number. Ultra pure (99.999% pure) argon contains 10 ppm air. Therefore, formation of oxides is almost unavoidable when carrying out reactions with volatile and extremely air-sensitive reagents inside of a dry-box or on a Schlenk line, unless additional measures are taken to minimize the amount of oxygen reaching the reaction volume. One way to minimize the amount of oxygen is to blanket the reaction vessel with a flow of ultra pure inert gas that has passed through additional oxygen-scavenging columns prior to reaching the reaction vessel. Alternatively, the relative amount of oxides formed during a reaction can be reduced by limiting the volume of gas in contact with the reaction medium and by increasing the amount of reagents used in the reaction.

Still referring to FIG. 1, the apparatus may include a reaction vessel 10 with a jacket 11. An inlet thermostatting liquid port 42 enters the jacket 11 and an outlet thermostatting liquid port 44 exits the jacket 11. The inlet thermostatting liquid port 42 is connected to the inlet of a refrigerated circulator 46. The outlet thermostatting liquid port 44 is connected to the outlet of the refrigerated circulator 46. The refrigerated circulator 46 allows the temperature of the reaction medium to be set within the temperature interval of about −70° C. to about +200° C. In other embodiments, the temperature of the reaction medium may be set to about −80° C. to about +400° C. Controlling the average temperature of the reaction medium may be desirable or necessary when the goal is to achieve a predetermined size and/or morphology for the product. Typically, low average reaction medium temperatures will yield smaller titanium product particles which are generally characterized by a relatively high specific surface area and high chemical reactivity. When formed in a relatively low temperature reaction medium the titanium or titanium-containing particles may be amorphous or have an extremely small crystallite size. On the other hand relatively high average reaction medium temperatures favor the formation of larger particles with a lower specific surface area and lower chemical reactivity. These higher temperature reaction conditions sometimes produce crystalline products and in the form of aggregated particles.

In the embodiment of FIG. 1 the illustrated apparatus is a batch apparatus in which reaction products may be removed from reaction vessel 10 by removal of cover 18.

The apparatus also may include a gas flow meter 48, which may be a chemically resistant gas flow meter. A needle valve 30 may allow fine adjustment of the gas flow, while the pressure gauge 32 and the gas flow meter 48 may enable the achievement of reproducible reaction conditions. The gas return line 24 of the gas line 21 may be connected to the inlet of the gas pump 32. The gas feed line 22 may be connected to the outlet of the gas pump 32, the needle valve 30, and the gas flow meter 48.

The gas return line 24 may also be connected to a condenser 50. The condenser 50 is connected to an outlet coolant line 52, a refrigerated circulator 54, and an inlet coolant line 56. The gas return line 24 also may be connected to the needle valve 30 and the inlet of the pressure gauge 32. The gas feed line 22 may be connected to the outlet of the pressure gauge 32, a hydrocarbon trap 58, an oxygen trap 60, and the gas flow meter 48. The condenser 50, the hydrocarbon trap 58, and the oxygen trap 60 may only be necessary when extremely volatile reagents are used in the apparatus.

Alkali metals and alkaline earth metals (especially magnesium) are available as reduction agents. However, either of the two eutectic alloys of sodium and potassium, $Na_{0.22}K_{0.78}$ and $Na_{0.44}K_{0.56}$, may be used in various embodiments because each is liquid at typical ambient conditions and easily dispersed as colloids (or finer) with ultrasonic energy in anhydrous liquid hydrocarbon media. In various embodiments, reducing metals may be used in a form that is readily dispersed in the liquid reaction medium. Further, in various embodiments the reductant metal(s) may be dispersed in the reaction medium before adding the halide precursor.

Precursor halides that are gases, or volatile and reactive liquids, or solids are reduced sonochemically. An example of a precursor gas is boron trichloride. Examples of liquid precursor halides are titanium tetrachloride ($TiCl_4$), vanadium tetrachloride ($VCl_4$), carbon tetrachloride, and silicon chlorides ($SiCl_4$ and $Si_2Cl_6$). Solid precursor halides that are not completely insoluble in the liquid sonochemical reaction medium are also suitable. Examples include platinum dichloride ($PtCl_2$), platinum dibromide ($PtBr_2$), Platinum diiodide ($PtI_2$), aluminum trichloride ($AlCl_3$), titanium trichloride ($TiCl_3$), platinum tetrachloride ($PtCl_4$), and zirconium tetrachloride ($ZrCl_4$).

In an experiment demonstrating an embodiment of the invention, a reaction apparatus was built and used in sonochemical syntheses involving precursors such as titanium tetrachloride, $TiCl_4$ (vapor pressure: 10 torr at 21° C.), hexachlorodisilane, $Si_2Cl_6$ (12 Torr at 40° C.), and silicon tetrachloride, $SiCl_4$ (vapor pressure: 195 Torr at 20° C.). The sonochemical syntheses produced high surface area metallic titanium and titanium disilicide powders.

Figure 2:
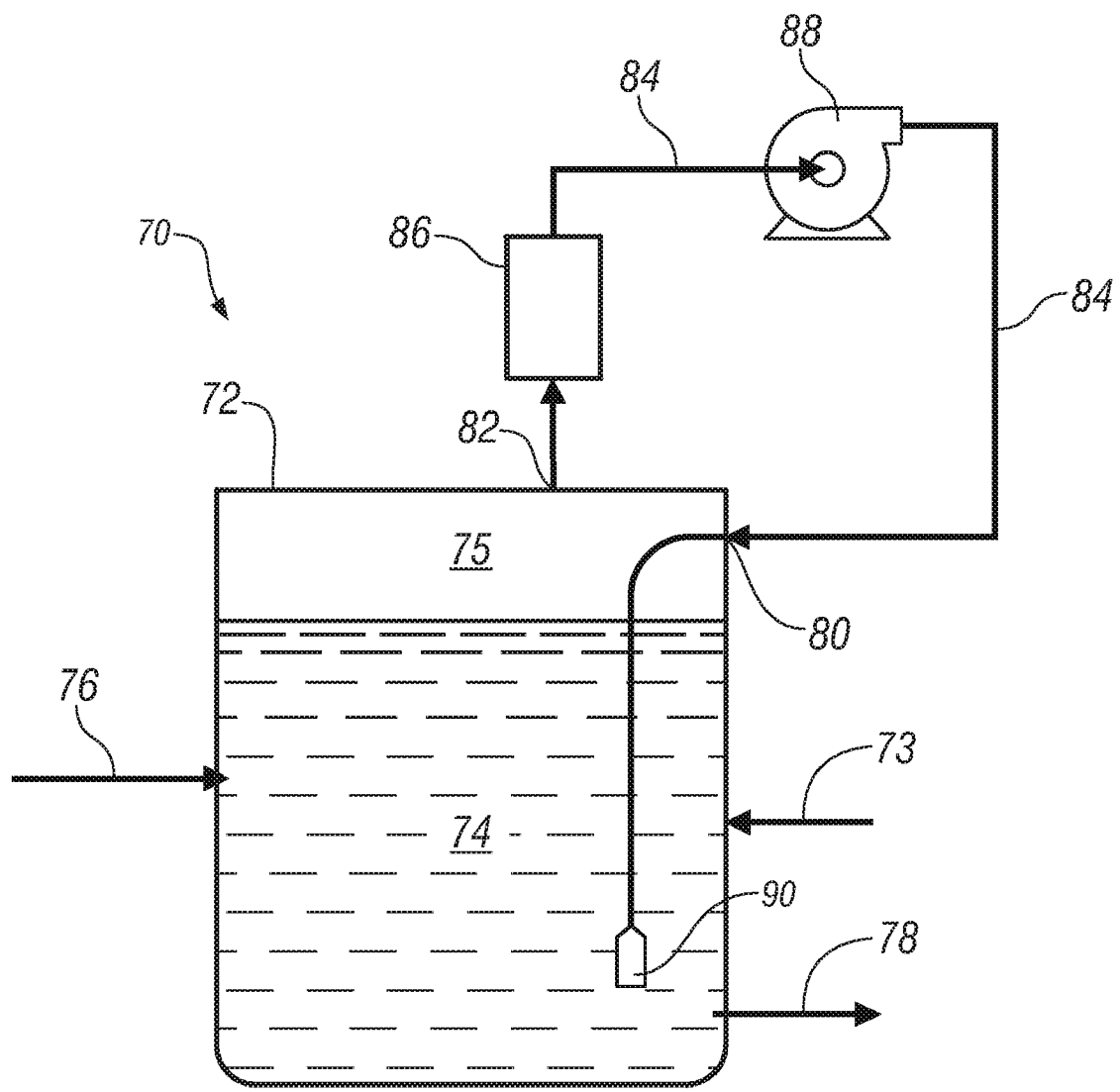
FIG. 2 is a schematic illustration of an apparatus according to another embodiment of the invention.

FIG. 2 illustrates another embodiment of apparatus for conduct of cavitation promoted reactions between one or more reactants that may be volatile and that may undergo unwanted reactions with moisture and/or oxygen. The illustration of FIG. 2 is of a generic combination of apparatus elements that are adaptable to different levels of reactant output and to batch or continuous-type operation.

Referring to FIG. 2, apparatus 70 includes a reaction chamber or reactor 72 which holds a reaction volume for a liquid reaction medium 74. Reactor 72 may be formed of any material of construction suitable for defining a specified volume configuration of the liquid reaction medium, and containing the reaction medium while the reactor and reaction medium are experiencing cavitation conditions for promoting an intended reaction.

Liquid reaction medium 74 is composed of a material in which ultrasonic vibrations or other suitable forms of cavitation may be induced to promote reactions between particles suspended in the liquid reaction medium and volatile reactant introduced into the vibrated liquid medium 74 or introduced in the gas space 75 above the liquid medium 74. The apparatus 70 also includes means for producing cavitation (indicated generically by arrow 73) in the liquid reaction medium 74. In various embodiments, a suitable cavitation means 73 may include, for example, a cavitation inducer acting on a wall of the reactor vessel 72 or it may include cavitation inducing plates immersed in the liquid reaction medium 74.

At least one reactant inlet 76 is provided for addition of reactants, for example a volatile liquid reactant, into the reaction volume of reaction vessel 72. The reactant inlet 76 may provide for the addition of reactants to at least one of the gas space or the liquid medium in the reaction chamber. Suitable valves may be provided to control the rate of supply of the reactant(s). A reaction product outlet 78 is provided for removal of the reaction products. In a batch-type reactor the removal of reaction products may occur after a specified reaction period, while in a continuous reactor reaction products may be withdrawn as steady state reaction conditions permit.

An inert gas inlet conduit 80 with a sparger 90 is provided for injecting a flowing stream of dry inert gas into the liquid reaction medium 74. A venting outlet 82 removes a stream of inert gas from the reaction volume. A recirculation conduit 84 re-circulates a stream of the inert gas from the venting outlet 82 to the inert gas inlet conduit 80. A heat exchanger 86 may be provided in the recirculation conduit 84 for condensing reaction medium entrained in the removed stream of inert gas for return to the liquid reaction medium 74. The recirculation conduit 84 may also include a pump 88. In other embodiments, the recirculation conduit 84 may also include at least one of an oxygen trap or a hydrocarbon trap (not shown).

The above description of embodiments of the invention is merely exemplary in nature and, thus, variations thereof are not to be regarded as a departure from the spirit and scope of the invention.

The invention claimed is:

1. An apparatus providing a reaction chamber for an oxygen-sensitive or water-sensitive reactant in a cavitation induced liquid reaction medium, the apparatus comprising:

a reaction chamber having a liquid space for a liquid reaction medium and a gas space overlying the liquid space when it contains liquid reaction medium, the reaction chamber excluding admission of ambient air;

means for producing cavitation in the liquid reaction medium;

at least one reactant inlet to at least one of the gas space or the liquid space for adding a reactant to the reaction chamber;

an inert gas inlet conduit with a sparger for injecting a flowing stream comprising inert gas into the liquid space of the reaction chamber;

a venting outlet for removal of a stream comprising inert gas from the gas space in the reaction chamber;

a recirculation conduit for re-circulating a stream of the inert gas from the venting outlet to the inert gas inlet conduit;

a heat exchanger in the recirculation conduit for condensing reaction medium entrained in the removed stream of inert gas for return to the reaction chamber;

and a reaction product outlet from the reaction chamber.

2. An apparatus as recited in claim 1 further comprising a gas pump in the recirculation conduit.

3. An apparatus as recited in claim 2 further comprising at least one of a needle valve, a pressure gauge, or a gas flow meter in the recirculation conduit to control the stream of the inert gas.

4. An apparatus as recited in claim 1 wherein the means for producing cavitation comprises an ultrasonic generator.

5. An apparatus as recited in claim 1 wherein the means for producing cavitation comprises a cavitation inducer acting on a wall of the reaction chamber.

6. An apparatus as recited in claim 1 wherein the means for producing cavitation comprises cavitation inducing plates immersed in the liquid reaction medium.

7. An apparatus as recited in claim 1 further comprising a hydrocarbon trap in the recirculation conduit.

8. An apparatus as recited in claim 1 further comprising an oxygen trap in the recirculation conduit.

\* \* \* \* \*